B. F. TEAL.
ELECTROTHERMOSTATIC TEMPERATURE CONTROLLER.
APPLICATION FILED JULY 30, 1910.
1,045,638.
Patented Nov. 26, 1912.
3 SHEETS—SHEET 1.
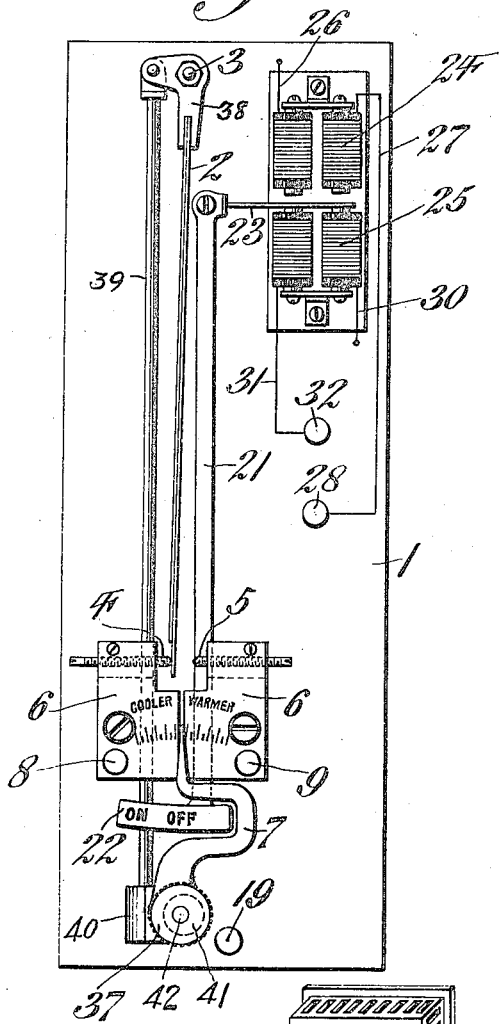
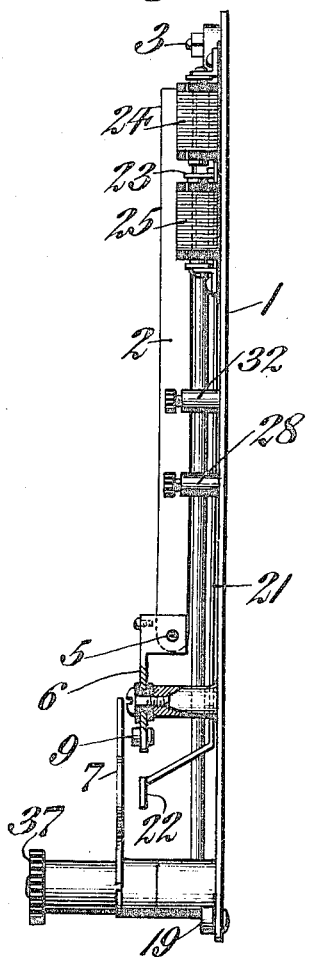
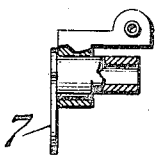
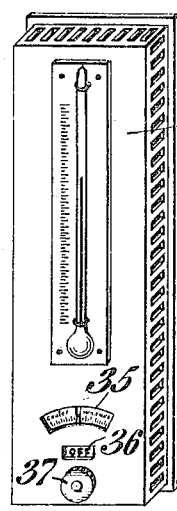
WITNESSES
INVENTOR
Benjamin F. Teal.
BY Wiedersheim & Fairbanks
ATTORNEYS

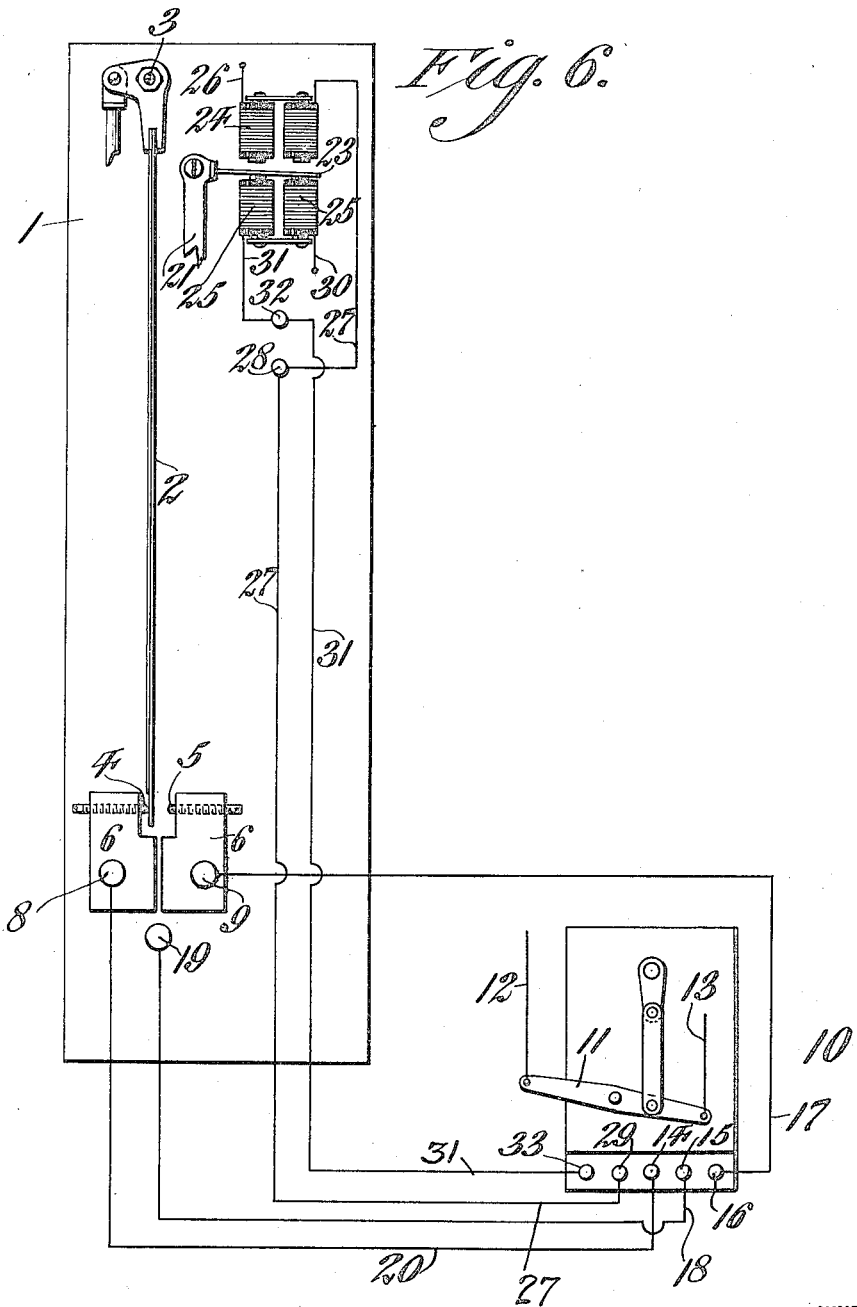

B. F. TEAL.
ELECTROTHERMOSTATIC TEMPERATURE CONTROLLER.
APPLICATION FILED JULY 30, 1910.
1,045,638.
Patented Nov. 26, 1912.
3 SHEETS—SHEET 3.
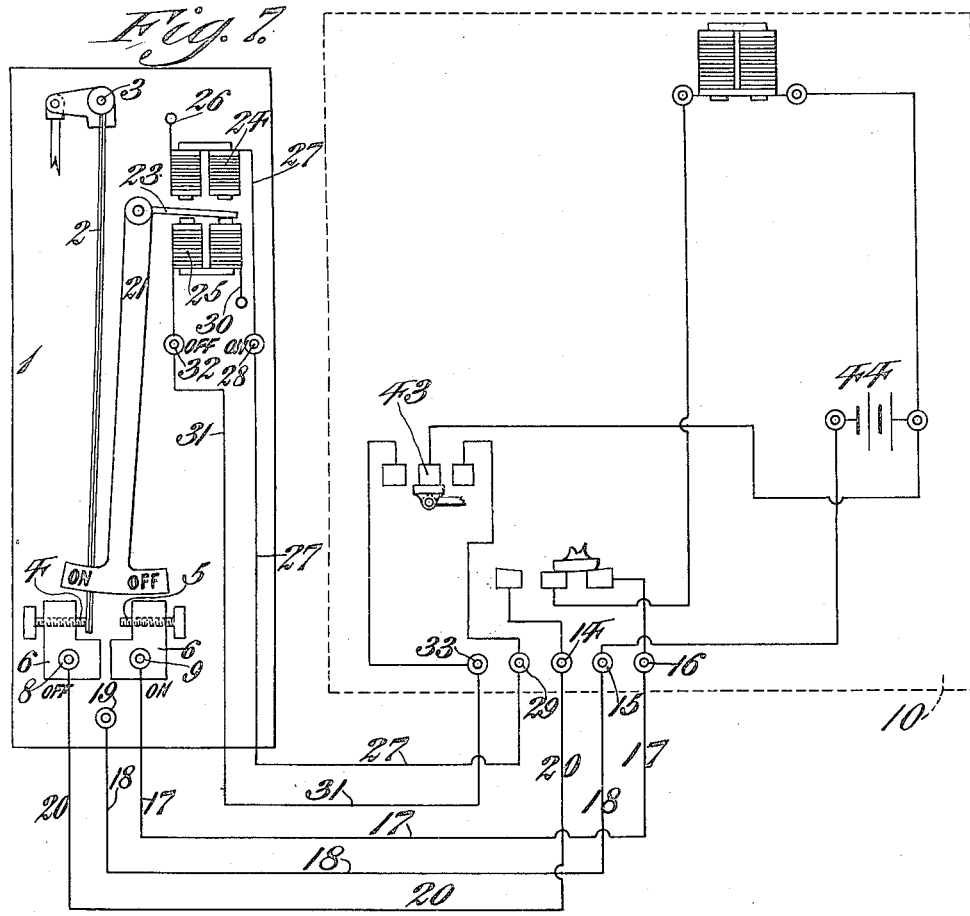
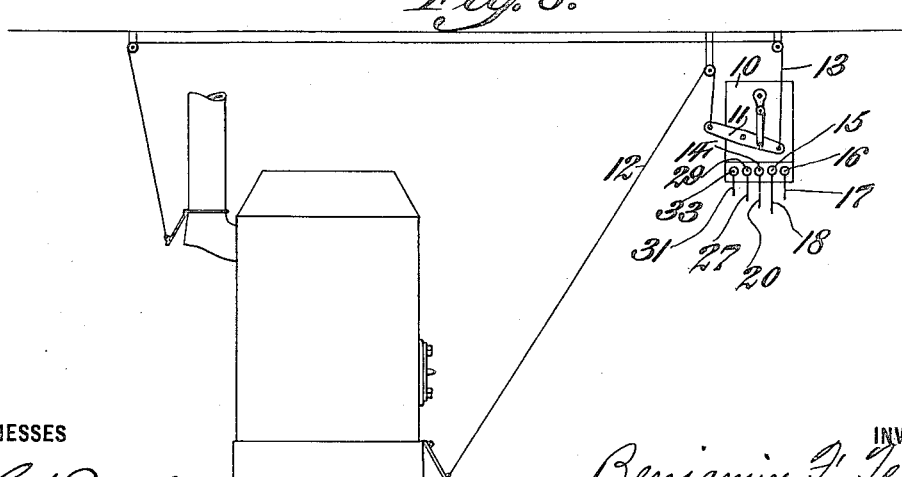
WITNESSES
L. Douville,
P. F. Nagle.
INVENTOR
Benjamin F. Teal.
BY Wiedersheim & Fairbanks.
ATTORNEYS

UNITED STATES PATENT OFFICE.

BENJAMIN F. TEAL, OF GLENSIDE, PENNSYLVANIA.

ELECTROTHERMOSTATIC TEMPERATURE-CONTROLLER.

1,045,638.

Specification of Letters Patent. Patented Nov. 26, 1912.

Application filed July 30, 1910. Serial No. 574,707.

*To all whom it may concern:*

Be it known that I, BENJAMIN F. TEAL, a citizen of the United States, residing at Glenside, county of Montgomery, State of Pennsylvania, have invented a new and useful Electrothermostatic Temperature-Controller, of which the following is a specification.

My invention relates to that class of mechanism by means of which an automatic regulation of temperature is obtained, and it consists of means for indicating the position of the control of the temperature generator, whether the same is for producing heat or cold. While such a device is capable of a large range of applications in the regulation or control of heat and cold, the particular form, hereinafter shown and described, is for regulating temperature for heating of buildings by any suitable means, although it will be understood that the same is equally applicable for temperature generators of any style. The ordinary forms of apparatus, for this purpose, control the increase and decrease of temperature by opening and closing the furnace draft dampers, and it is highly important, as regards both safety and economy, that the position of said dampers be shown, at or near, the controlling device or other desired location.

In my application for United States Letters Patent, filed July 22nd, 1910, Serial No. 573,163, I have shown and described a system of automatic temperature regulation; and the object of my invention, as herein set forth, is to provide a means whereby the position of the temperature regulating mechanism be shown in an absolutely reliable manner, at any desired point of observation.

Another object of my invention is to provide such means of indication in that part of system described in my hereinbefore mentioned application, which is therein named the "controller" and to electrically actuate said indicator by the part called the "motor" which is the means by which the draft dampers are operated.

From the above it will be understood that I have provided a temperature generator with means for increasing or decreasing the action thereof, and I have provided means, operated by a desired temperature, for controlling said increasing and decreasing means; and I further provide an indicator, suitably connected, to indicate the positions of said increasing or decreasing means.

In the drawings I have shown a construction for carrying out my invention, which I have found operates successfully in practice, but it will be evident that the arrangement of the parts and application of the same may be varied, other instrumentalities may be employed, and changes may be made in the construction, which will come within the scope of my invention, and I do not, therefore, desire to be limited, in every instance, to the exact form as herein shown and described, since the same is one form of illustrating the spirit of my invention, and I therefore desire to make such changes as may be necessary.

Figure 1 represents an elevation of a form of controller which may be employed, showing my invention applied thereto. Fig. 2 represents a side elevation thereof. Fig. 3 represents a perspective view of a controller. Figs. 4 and 5 represent sectional views of portions of the device in detached position. Fig. 6 represents a diagrammatic view on an enlarged scale showing the electrical circuits. Fig. 7 represents a diagrammatic view showing the relation of the circuits, a source of electro-motive force, and the circuit controllers. Fig. 8 represents a diagrammatic view showing the generator and connections.

Similar numerals of reference indicate corresponding parts in the figures.

Referring to the drawings, 1 designates a controller of any suitable construction, in the present instance, being provided with a thermostatic element 2, pivotally mounted at 3 and, one end of which is movable between, and is adapted to contact with, one or the other of the two contact points 4 and 5, suitably mounted upon the controller 1.

6 designates, in the present instance, plates provided with notations thereon to indicate the degree of temperature desired; and 7 designates a hand or pointer which is adapted to be manually operated, and in order to adjust the controller to the point at which it is desired that the controller operate, it being understood that all necessary parts are included in order to make an operative device.

8 designates a binding post, carried by the controller, which is in suitable connection with the contact point 4, and 9 designates a binding post which is in suitable connection with the contact point 5.

10 designates a motor, which it will be understood, is suitably situated with respect to the temperature generator, such as a furnace, and which is of any suitable or desired construction, in the present instance, being provided with a lever 11 in suitable connection with the operative parts of the motor, one end of which lever is connected with one of the dampers of the temperature generator, say the air admission damper, by means of a connection 12, while the opposite end of the lever, is suitably connected with a check draft damper of the temperature generator, by a connection 13, said connections being secured upon the opposite sides of the pivotal point of the said lever.

14 designates a binding post, which is in suitable connection with the operative parts of the motor, in order that, when the circuit thereof is closed, the motor will be actuated to close the drafts.

15 designates a binding post which is in suitable connection with the battery of the motor; and 16 designates a binding post which is in suitable connection with the operative parts of the motor 10 in order that, when the circuit thereof is closed, the motor will be actuated to open the drafts.

17 designates a conductor, which is in suitable connection with the binding post 16 of the motor 10 and with the binding post 9 of the controller 1, whereby it will be understood that the contact point 5 is here shown as being in the circuit in which the drafts will be opened when the thermostatic element 2 contacts therewith, to close the circuit.

18 designates a conductor which is in suitable connection with the battery binding post 15 of the motor and with a binding post 19 which is suitably supported by the controller 1, whereby said binding post 19 will be suitably connected with the battery of the motor.

20 designates a conductor, in suitable connection with the binding post 14 of the motor and with the binding post 8 of the controller, whereby it will be understood that the contact point 4 is the one with which the thermostatic element 2 will contact in order to close or shut off the draft.

The operation of these parts just described will be readily apparent. When the thermostatic element 2 is in the position seen in the figures, the end thereof is in contact with the contact point, 4, in which event, the circuit will be closed to the battery of the motor, as follows:—through the binding post 15, the conductor 18, to the binding post 19, of the controller, and through the base plate thereof to the thermostatic element 2, to the contact point 4, to the binding post 8 and through the conductor 20 to the binding post 14, of the motor, which is actuated, or will be in position, to close off the drafts. Should, however, the temperature fall below the desired point, the thermostatic element 2 will be actuated in order that the end thereof will contact with the contact point 5 in which event the circuit in the battery will be as follows:—through the binding post 15 of the motor 10, through the conductor 18, through the binding post 19, through the base plate thereof to the thermostatic element 2 to the contact point 5 and through the binding post 9 and the conductor 17, to the binding post 16 of the motor which latter will be actuated in order to open the air admission draft and close the check draft, as will be evident.

In order to indicate the position of the dampers to show whether the action of the temperature generator, that is the furnace, is increased or decreased, that is, whether the dampers are opened or closed, I have mounted, in the present instance, upon the controller, 1, an arm 21 provided, in the present instance, with a plate 22 on which I have provided the notations "On" and "Off," said arm 21 in the present instance being pivotally mounted upon the controller and being provided with an armature 23 which is movable between and adapted to be attracted by one or the other of the electro-magnets 24 and 25, suitably mounted in the present instance upon the controller 1. The electro-magnet 24, in the present instance, is suitably connected with a conductor 26 which is in connection with the controller 1 and said electro-magnet 24 is provided with a conductor 27 which, engaging the binding post 28, is connected with a binding post 29 mounted upon the motor 10. The other electro-magnet 25 is provided with a conductor 30 which is in connection with the controller 1 and is provided with a conductor 31 which, engaging the binding post 32 is connected with a binding post 33 mounted on the motor 10, it being understood that the motor is provided with two circuit controlling elements, one of which is adapted to be in connection with the binding post 29 in one position of the motor and the other of which circuit controlling element is adapted to be in connection with the binding-post 33 in the other position of the motor, it being seen that in the present construction the binding-post 29 is adapted to be in connection with this circuit controlling element, when the motor is in position to throw on the drafts; and the binding post 33 is in connection with the circuit controlling element when the motor is in position to turn off the drafts.

43 designates the contact point of the motor switch which is in suitable connection with one pole of the battery 44, the other pole of which battery is in suitable connection with the binding post 15. As will be understood, the magnet 25 is in suitable connection with the conductor 30 and the conductor 31, which is connected with the binding post 33, so that when the circuit controlling element of the motor is moved to a position to be in connection with the binding post 33 and with the contact point 43 of the motor switch, which is in suitable connection with the battery 44 and which latter is in suitable connection with the binding post 15, the circuit will be closed and the magnet 25 will be energized, which thus attracts the armature 23 and moves the arm 21 to place the word "off" in position to be visible, it being understood that the operation of the motor is such that, when the thermostatic element 2 contacts with the contact point 4, the circuit will be closed with respect to the motor in such a manner as to move the circuit controlling element into position to be in connection with said binding post 33 and with said contact point 43, to set the indicator, after which the circuit controlling element is moved to a position to contact solely with the contact point 43, as seen in its position in Fig. 7, thus opening the circuit, the armature, however, remaining in the position seen in Figs. 6 and 7. Should the thermostatic element 2 be moved to contact with the other contact point 5, the circuit will be closed which will actuate the motor 10, to put on the drafts, and which will actuate the motor to cause the circuit controlling element to be in connection with the binding post 29 and the contact point 43 of the motor switch, so that the circuit will be closed through the conductor 27, magnet 24 and conductor 26, and through the bindnig post 19 and conductor 18 and the binding post 15 of the battery 44, thus energizing the magnet 24, to attract the armature 23 to move the word "on" carried by the indicator to a position to be visible, after which the controlling element of the motor is moved back to its position, as seen in Fig. 7, that is in contact, solely, with the contact point 43 leaving the circuit open, the armature 23, however, remaining in its attracted position. It will be understood that the conductors 30 and 26 are in suitable connection with the plate of the controller 1, and through the binding post 19, binding post 15, with a pole of the battery of the motor.

From this it will be seen that I have provided a visual indicator which is suitably connected in order to be actuated at all times solely by the motor, so that it will indicate exactly the position of the increasing or decreasing means of the temperature generator and so that no false position of the said indicator can occur without a proper indication.

As seeen in Fig. 3, I preferably desire to cover the operative parts of the controller with a cap or covering 34 which is provided with a suitable opening 35 through which the notations on the plate 6 are visible; and I further provide an opening 36 in order that the notations on the indicator will be visible; and it will also be seen that I provide an opening for the reception of the post 37 for the operation of the pointer 7.

The thermostatic element 2, in the present instance, is carried by one arm of the bell-crank lever 38 which is pivotally mounted at 3, the opposite arm of said lever being connected with a rod 39, which is connected with an eccentric block 40, which is in engagement with an eccentric 41, which is carried by a stud 42 supported by the plate of the controller 1, said eccentric 41 being in suitable engagement with the post 37, in order that by operation of the post 37 the eccentric is actuated in order to slightly raise or lower the eccentric block 40 and in order to slightly raise or lower the rod 39 and so adjust the position of the thermostatic element 2, in order to provide means for adjusting the temperature at which it is desired the thermostatic element operate.

Having thus described my invention, what I claim as new and desire to secure by Letters Patent, is:—

The combination with a heat generator having dampers, a motor for actuating the said dampers, a thermostat having electrical connections to said motor for governing the said motor, a visual indicator suitably located, and independent electrical connections from said motor to said indicator whereby the position of the dampers as moved by said motor is indicated at all times.

BENJAMIN F. TEAL.

Witnesses:
WM. CANER WIEDERSEIM,
C. D. MCVAY.